United States Patent [19]

Schoening et al.

[11] Patent Number: 4,479,336

[45] Date of Patent: Oct. 30, 1984

[54] CONCRETE COVER FOR HIGH PRESSURE VESSELS

[75] Inventors: Josef Schoening, Hambruecken; Hans-Georg Schwiers, Ketsch, both of Fed. Rep. of Germany

[73] Assignee: Hochtemperatur-Reaktorbau GmbH., Cologne, Fed. Rep. of Germany

[21] Appl. No.: 327,036

[22] Filed: Dec. 3, 1981

[30] Foreign Application Priority Data

Dec. 23, 1980 [DE] Fed. Rep. of Germany ....... 3048592

[51] Int. Cl.$^3$ .............................................. E04C 3/10
[52] U.S. Cl. .................................... 52/223 R; 52/21; 52/245; 220/3
[58] Field of Search ..................... 52/223 R, 245, 224, 52/21; 220/327, 328, 3, 315

[56] References Cited

U.S. PATENT DOCUMENTS

| | | | |
|---|---|---|---|
| 3,568,379 | 3/1971 | Johnsson et al. | 52/224 X |
| 3,965,630 | 6/1976 | Roberts | 220/3 X |
| 4,057,162 | 11/1977 | Gross | 52/223 R X |
| 4,195,457 | 4/1980 | Kissling et al. | 52/223 R X |
| 4,349,991 | 9/1982 | Schwiers et al. | 220/315 X |
| 4,366,653 | 1/1983 | Lafitte et al. | 52/224 |

Primary Examiner—Carl D. Friedman
Attorney, Agent, or Firm—Schwartz, Jeffery, Schwaab, Mack, Blumenthal & Koch

[57] ABSTRACT

A closure for a prestressed high-pressure vessel comprises an anchoring ring surrounding the opening of the prestressed concrete pressure vessel, a plurality of axial stressing cables and a plurality of cover stressing cables. The cover is separately prestressed and simultaneously anchored to the prestressed concrete pressure vessel. The anchoring rings on the concret need for releasing the axial stressing cables of the prestressed concrete pressure vessel.

12 Claims, 2 Drawing Figures

CONCRETE COVER FOR HIGH PRESSURE VESSELS

BACKGROUND OF THE INVENTION

1. Field of the Invention:

The invention concerns a concrete cover for large openings of vessels under high pressures, preferably for cavities of passages clad with a liner in a prestressed concrete pressure vessel for nuclear reactors, wherein the cover is placed upon the opening and held in place by stressing cables.

2. Background of the Prior Art:

In West German Offenlegungsschrift No. 17 84 625, a removable cover made of prestressed concrete is illustrated. This cover is designed specifically for a vessel with a cylindrical or prismatic circumferential wall or shell and two closing bottoms. The design provides a wreath of presure bodies or pressure pieces around a center sealing piece with each of these pressure bodies being arranged on the circumference of the vessel. The bodies carry anchoring devices on their outer frontal surfaces. These anchoring devices permit the attachment of the longitudinal stressing elements of the vessel and the supporting means of the circumferential stressing band. The cover may be removed from the vessel by lifting it off without appreciably altering the prestressed state of the vessel. For reasons of weight, the cover piece is formed by an assembly of several disks which are securely pressed against each other by stressing elements arranged in the longitudinal direction of the vessel.

A further cover is known from West German Offenlegungsshrift No. 24 57 661 equipped with at least two concentric annular grooves extending circumferentially on top with the stress cables for the annular prestressing of the cover being arranged in these grooves. Positive locking elements connect the individual parts of the cover. The outermost annular part of the cover is prestressed by means of the stress cables from the vessel itself. The positive locking elements make it possible to remove the individual annular parts of the cover without releasing the prestressing of the prestressed concrete pressure vessel. Herein, however, the outermost part is connected by means of the prestressing cables of the vessel with the latter.

In West German Offenlegungsschrift No. 27 10 859, a cover part for large opening is described wherein the cover function and the load carrying function of the cover are effected separately. The cover is prestressed by means of stress elements.

SUMMARY OF THE INVENTION

The present invention is based on this state-of-the art and has as an object to make it possible to disengage the cover from the prestressed concrete pressure vessel without releasing or loosening the prestressed state of the prestressed concrete pressure vessel.

This object is attained according to the invention by providing an anchoring ring surround the opening of the vessel engaging axial stress cables of the prestressed concrete pressure vessel surrounding the opening to the anchoring ring (with their upper stressing devices) and fastening the cover to the anchoring ring by means of separate stress cables.

A preferred embodiment of the invention is obtained by arranging a retaining ring on the upper part and outer rim of the concrete cover. The concrete cover may be prestressed from this retaining ring. Preferably, the steel or cast iron retaining ring is set into the top part of the cover. This results in a smooth surface of the cover. The outer diameter of the retaining ring may be as large as the outer diameter of the cover.

A simple embodiment of the anchoring ring comprises placing the anchoring ring on the prestressed concrete pressure vessel at the outer rim of the opening. The outer diameter of the concrete cover has the same dimension as the outer diameter of the anchoring ring. The concrete cover is prestressed by means of the retaining ring and the anchoring ring. In order to render the support surface of the cover on the prestressed concrete pressure vessel flat, the anchoring ring is set into the upper rim of the opening of the prestressed concrete pressure vessel.

According to a further embodiment of the invention, the cover is stresed by means of stress cables from the pitch circle of the retaining ring outwardly from the center of the anchoring ring, alternatingly to the outer pitch circle and to the inner pitch circle. This stressing on alternate sides makes it possible to transmit the tensile force favorably from the center pitch circle of the retaining ring accurately in the direction of the prestressing of the concrete to the lower anchoring ring, i.e. the forces generated are provided with a direction of action.

According to a further embodiment, the prestressing of the concrete cover may be effected by utilizing anchoring bolts. This is accomplished by placing the bolt anchors in two pitch circle arrangements, wherein the stress cables of the vessel are engaging the center. Following the lifting of the concrete cover, the resetting of the concrete cover on the bolt anchors is easily accomplished.

Another embodiment of the concrete cover design according to the invention provides for the anchoring of the anchoring ring in the prestressed concrete pressure vessel. As the result of the anchoring of the anchoring ring in the prestressed concrete pressure vessel, the concrete cover is prestressed even when the stress cables of the vessel permit only a partial anchoring of the anchoring ring.

Each of the foregoing emdoments comprise variations in the arrangement of the removable stressed cover assembly for prestressed concrete pressure vessels. These vessels are employed in high temperature, gas cooled nuclear reactors such as those described in U.S. Pat. Nos. 4,045,285 and 4,175,001, the disclosures of which are incorporated herein. Conventional anchoring, stressing, and securing means may also be supplementally and/or alternatively employed in the assembly.

BRIEF DESCRIPTION OF THE DRAWINGS

The invention shall become more apparent in the embodiment illustrated hereinafter.

In the drawing.

DETAILED DESCRIPTION OF THE EMBODIMENTS

Figure 1:
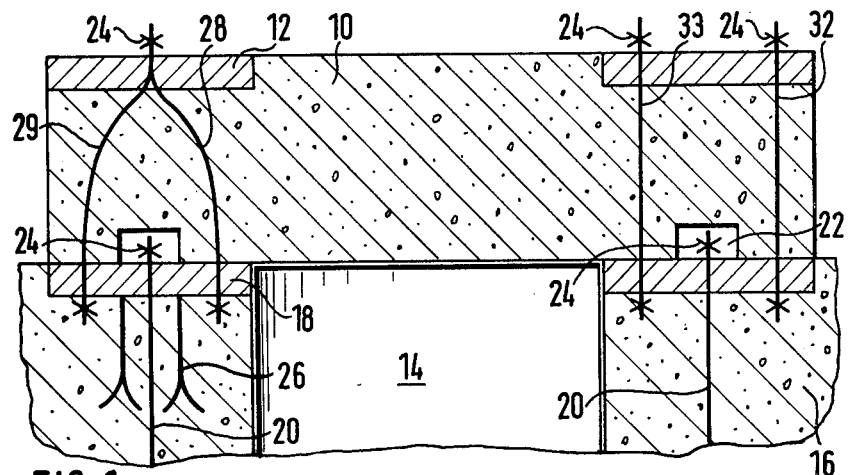
FIG. 1 shows a side view cross section of a closing cover and a portion of a prestressed pressure vessel.

The sectional view shown in FIG. 1 illustrates a concrete cover 10 upon which an upper retaining ring 12 is resting on the outer rim of the concrete cover 10. The concrete cover 10 is seated over the opening 14 of a prestressed concrete pressure vessel 16. The lower anchoring ring 18 is placed on the outer rim of the opening 14 of the prestressed concrete pressure vessel 16 in a flat recessed state. The stress cables 20 of the vessel may be prestressed without the need for the concrete cover 10 to be seated. A recess 22 is provided in the concrete cover 10. The anchoring bolts 24 of the stress cables of the vessel 20 are contained therein. The lower anchoring ring 18 may be equipped alternatively or additionally with the anchors 26. The cover stress cables 28 and 29 shown on the left side of FIG. 1 are stressed from the lower anchoring ring 18 to the upper retaining ring 12. The stress cables 28 and 29 of the cover are running from the center of the upper retaining ring 12 alternatingly to the lower anchoring ring 18. A straight bolt anchor 32 is also illustrated in FIG. 1 for the cover as an additional embodiment.

Figure 2:
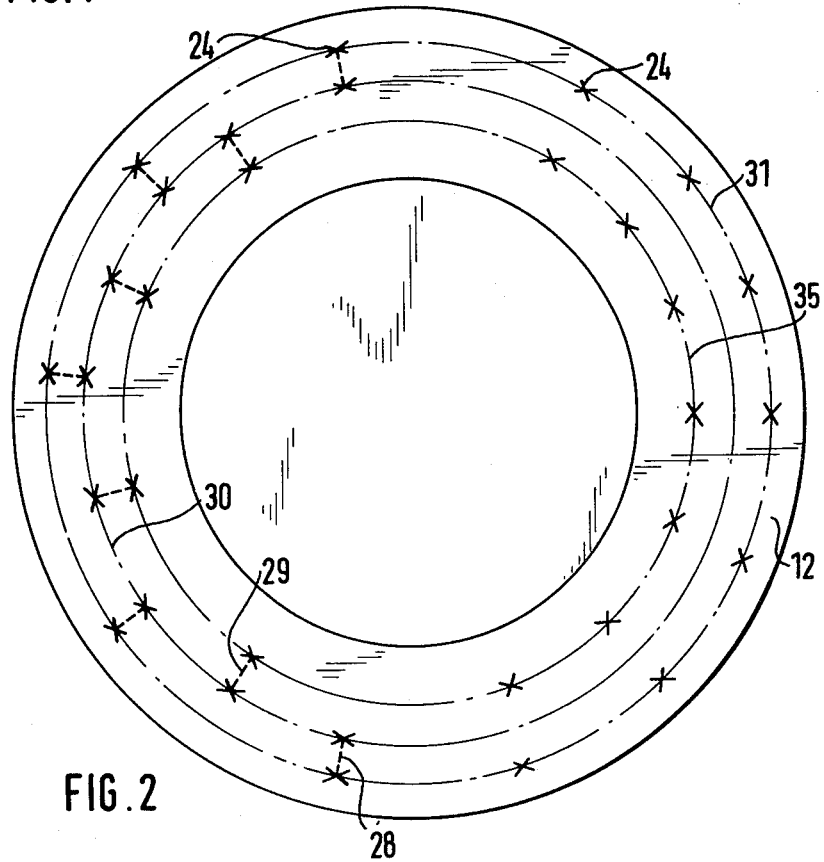
FIG. 2 illustrates a top view of a cover with an arrangement of stress cables of the cover and the anchoring of a bolt on the retaining ring.

FIG. 2 presents a top view of the cover 10, wherein the two arrangements and possible modes of the prestressing of the cover by means of stress cables 28, 29 or anchoring bolts 32, 33 are shown. One mode of prestressing provides (on the left side of FIG. 2) the cover stress cables 28, 29 on the concrete cover 10. The cover stress cable 28 runs from the pitch circle 30 of the retaining ring 12 to the outer pitch circle 31 of the lower anchoring ring 18. The next anchoring bolt 24 on the pitch circle of the retaining ring 12 is stressed by means of the cover stress cable 29 to the inner pitch circle 35 of the lower anchoring ring 18. The direction of the cover stress cables 28, 29 alternates from the pitch circle 30 of the retaining ring 12 with each successive anchoring bolt 24 to the inner pitch circle 35 and then to the outer pitch circle 31 of the anchoring ring 18. The arrangement on the right hand side of the drawing provides the bolts 32, 33 for the prestressing of the cover. The bolts are arranged in two pitch circles 32, 33. They are located alternatingly outside and inside the center pitch circle 30 of the anchoring ring 18, which is engaged by the cover stressing cables 20 from the prestressed concrete pressure vessel 12 from the underside. The cover 10 is thus provided with a simple and cost effective prestressing possibility, together with a mode of anchoring. It may be lifted easily from the opening of the prestressed concrete pressure vessel, independently of the state of prestressing of the prestressed concrete pressure vessel.

What is claimed is:

1. A removable stressed concrete cover for large openings in prestressed concrete pressure vessels comprising:
    an anchoring ring surrounding the rim area of the opening;
    a plurality of axial stressing cables extending from the prestressed concrete pressure vessel and through said anchoring ring;
    an anchoring bolt securing the end of each of said axial stressing cables to said anchoring ring;
    a concrete cover member;
    a plurality of cover stressing cables extending through said concrete cover member through said anchoring ring and into the prestressed concrete pressure vessel, and at least two of said cover stressing cables being joined at one end and secured by a single anchoring bolt;
    means for releasably securing said cover stressing cables to said concrete cover member whereby releasing said cover stressing cables does not affect said axial stressing cables, and a retaining ring on the outer rim of the upper part of said concrete cover member wherein said cover stressing cables extend through said retaining ring and are arranged in pitch circles alternatingly from an inner pitch circle to an outer pitch circle about the central axis of said retaining ring.

2. The removable stressed concrete cover of claim 1 wherein said anchoring ring rests on the prestressed concrete pressure vessel at the rim of the opening of the vessel.

3. The removable stressed concrete cover of claim 4 wherein said anchoring ring and said retaining ring have the same dimensions.

4. The removable stressed concrete cover of claim 3 wherein said concrete cover member has the same diameter as the outer diameter of said anchoring ring and said retaining ring.

5. The removable stressed concrete cover of claim 1 or 3 wherein said cover stressing cables are arranged in pitch circles about the central axis of said concrete cover member.

6. The removable stressed concrete cover of claim 5 wherein said stressing cables are arranged alternatingly from an inner pitch circle to an outer pitch circle on said concrete cover.

7. The removable stressed concrete cover of claim 1 or 3 wherein said anchoring ring is anchored in the prestressed concrete vessel.

8. The removable stressed concrete cover of claim 7 wherein each of said bolts securing said axial stressing cables are arranged in a groove in the lower surface of said concrete cover member.

9. The removable stressed concrete cover of claim 8 wherein said bolts securing said axial stressing cables form a circle surrounding the opening in the prestressed concrete pressure vessel and said groove is an annular groove.

10. The removable stressed concrete cover of claim 9 wherein said prestressed concrete pressure vessel houses a nuclear reactor.

11. The removable stressed concrete cover of claim 10 wherein said opening in said prestressed concrete pressure vessel further comprises a metal lining of the concrete surfaces.

12. The removable stressed concrete cover of claim 7 further comprising at least one anchoring bolt securing at least one of said axial stressing cables, said bolt anchor located in the center between two bolt anchors of said two pitch circles.

* * * * *